United States Patent
Chou et al.

(10) Patent No.: US 7,312,421 B2
(45) Date of Patent: Dec. 25, 2007

(54) DETACHABLE HEAT SEALING APPARATUS

(75) Inventors: Ammy Chou, 4th Fl., No. 276, Sec. 1, Ta Tung Rd., Hsi Chih Town, Taipei Hsien (TW); Richard Chang, Taipei Hsien (TW)

(73) Assignee: Ammy Chou, Taipei Hsien (TW)

( * ) Notice: Subject to any disclaimer, the term of this patent is extended or adjusted under 35 U.S.C. 154(b) by 0 days.

(21) Appl. No.: 10/841,457

(22) Filed: May 10, 2004

(65) Prior Publication Data

US 2004/0262281 A1 Dec. 30, 2004

(30) Foreign Application Priority Data

Jun. 25, 2003 (TW) .............................. 92117295 A

(51) Int. Cl.
*H05B 1/00* (2006.01)

(52) U.S. Cl. .................. 219/243; 219/221; 219/225; 219/227; 219/229; 219/231; 219/240; 219/243; 219/254; 219/533; 156/515

(58) Field of Classification Search ................ 219/209, 219/221, 225, 226, 231, 240, 243, 254, 385, 219/533, 548

See application file for complete search history.

(56) References Cited

U.S. PATENT DOCUMENTS

| | | | | |
|---|---|---|---|---|
| 5,142,123 A | * | 8/1992 | Chou | ......................... 219/243 |
| 5,374,806 A | * | 12/1994 | Chou | ......................... 219/229 |
| 6,326,594 B1 | * | 12/2001 | Chang et al. | ............... 219/243 |

* cited by examiner

*Primary Examiner*—Tu Ba Hoang
*Assistant Examiner*—Stephen J. Ralis
(74) *Attorney, Agent, or Firm*—Bacon & Thomas, PLLC

(57) ABSTRACT

A detachable heat sealing apparatus includes a size-adjustable unitary externally-attached electric heating device and a power supplier, wherein the electric heating device is coupled to the external front side of a power supplier holding casing by means of a detachable coupling arrangement such that the electric heating device or the power supplier can be replaced when damaged or, a different model of electric heating device can be fastened to the casing to substitute the original electric heating device.

8 Claims, 5 Drawing Sheets

DETACHABLE HEAT SEALING APPARATUS

BACKGROUND OF THE INVENTION

1. Field of the Invention

The present invention relates to an electric heat sealing apparatus and, more particularly, to a detachable heat sealing apparatus, which allows a user to replace a size-adjustable unitary externally-attached electric heating device when damaged, or to change the model of the electric heating device subject to different sealing requirements.

2. Description of Related Art

Electric heat sealing apparatuses are commonly used in shops and stalls to seal polybags or the like, keeping packed foods or articles from contamination.

However, regular heat sealing apparatus are commonly made in integrity, i.e., the shell holding the power supplier and the shell holding the electric heating device are fixedly connected together and not detachable. When the power supplier or the electric heating device gets damaged, the whole assembly of the heat sealing apparatus becomes useless and must be thrown away. It is neither convenient nor economic to use such a kind of heat sealing apparatus.

Further, a different model of a heat sealing apparatus has a different design of electric heating device. For example, a heat sealing apparatus having an electric heating device with an elongated metal heating element or a heat sealing apparatus having an electric heating device with a short metal heating element may be separately used to fit different sealing requirements. Because the electric heating devices of conventional heat sealing apparatuses are not replaceable, consumers may have to prepare various heat sealing apparatuses to fit different sealing requirements.

Further, various prior art heat sealing apparatuses are known. The inventor has also invented various designs of heat sealing apparatuses, for example, the designs disclosed in Taiwan Patent Publication Nos. 370078; 370077; and 356811.

SUMMARY OF THE INVENTION

The present invention has been accomplished under the circumstances in view. It is therefore an object of the present invention to provide a detachable heat sealing apparatus, which allows the user to replace, from the exterior of the heat sealing apparatus, a size-adjustable unitary externally-attached electric heating device or the power supplier when damaged, or to change the model of the electric heating device subject to different sealing requirements.

To achieve these and other objects of the present invention, the detachable heat sealing apparatus is comprised of an elongated casing, a power supplier, a size-adjustable unitary externally-attached electric heating device, and a handle. The elongated casing comprises a receiving chamber, a coupling structure, and a mounting structure, wherein the receiving chamber is adapted to accommodate the power supplier. The power supplier is mounted in the receiving chamber inside the elongated casing, having contact means disposed on the outside of the elongated casing for output of electric power. The size-adjustable unitary externally-attached electric heating device comprises a coupling structure, and power terminal means. The coupling structure is detachably coupled to the coupling structure of the elongated casing, the power terminals are maintained in contact with the contact means of the power supplier after connection of the electric heating device to the elongated casing. The handle has a mounting structure pivotally fastened to the mounting structure of the elongated casing for enabling the handle to be turned relative to the elongated casing.

The main feature of the present invention is the detachable design of the power supplier and the electric heating device, i.e., the detachable coupling arrangement between the coupling structure of the externally-attached electric heating device and the coupling structure of the elongated casing, the elongated casing holds the power supplier, the electric heating device can be detached from exterior of the elongated casing for a replacement. Therefore, the user can replace the externally-attached electric heating device or the power supplier when it is damaged, or change the model of the electric heating device to fit different sealing requirements when desired.

According to a first embodiment of the present invention, the coupling structure of the elongated casing is comprised of two hooks, and the coupling structure of the externally-attached electric heating device is comprised of two hook holes adapted to receive the hooks of the coupling structure of the elongated casing. Alternatively, hooks can be provided at the electric heating device, and hook holes can be formed in the elongated casing to receive the hooks at the electric heating device. The power supplier comprises two power terminals extended out of the elongated casing and forming the positive and negative contacts, and at least one power source member, for example, at least one battery cell electrically connected to the power terminals.

According to another embodiment of the present invention, the heat sealing apparatus is comprised of an elongated casing, a power supplier, and a size-adjustable unitary externally-attached electric heating device. The elongated casing comprises a receiving chamber, and a coupling structure, wherein the receiving chamber is adapted to accommodate the power supplier. The power supplier is mounted in the receiving chamber inside the elongated casing, having contact means disposed on the outside of the elongated casing for output of electric power. The externally-attached electric heating device comprises a coupling structure and power terminal means, wherein the coupling structure is detachably coupled to the coupling structure of the elongated casing, and the power terminal means is maintained in contact with the contact means of the power supplier after connection of the electric heating device to exterior of the elongated casing. The coupling structure of the elongated casing can be a dovetail tongue, and the coupling structure of the externally-attached electric heating device can be a dovetail groove which receives the dovetail tongue of the elongated casing. The power supplier comprises two power terminals extended out of the elongated casing and forming the positive and negative contacts, and at least one power source member, for example, at least one battery cell electrically connected to the power terminals.

Therefore, by means of the coupling structure of the externally-attached electric heating device and the coupling structure of the elongated casing, the electric heating device is detachably fastened to the exterior of the elongated casing and maintained electrically connected to the power supplier. When desired or if the externally-attached electric heating device is damaged, the user can replace the electric heating device or change the model of the electric heating device. Except the aforesaid hook joint and swivel joint, the male and female coupling structures between the externally-attached electric heating device and the elongated casing may be variously embodied.

DETAILED DESCRIPTION OF THE PREFERRED EMBODIMENT

Figure 1:
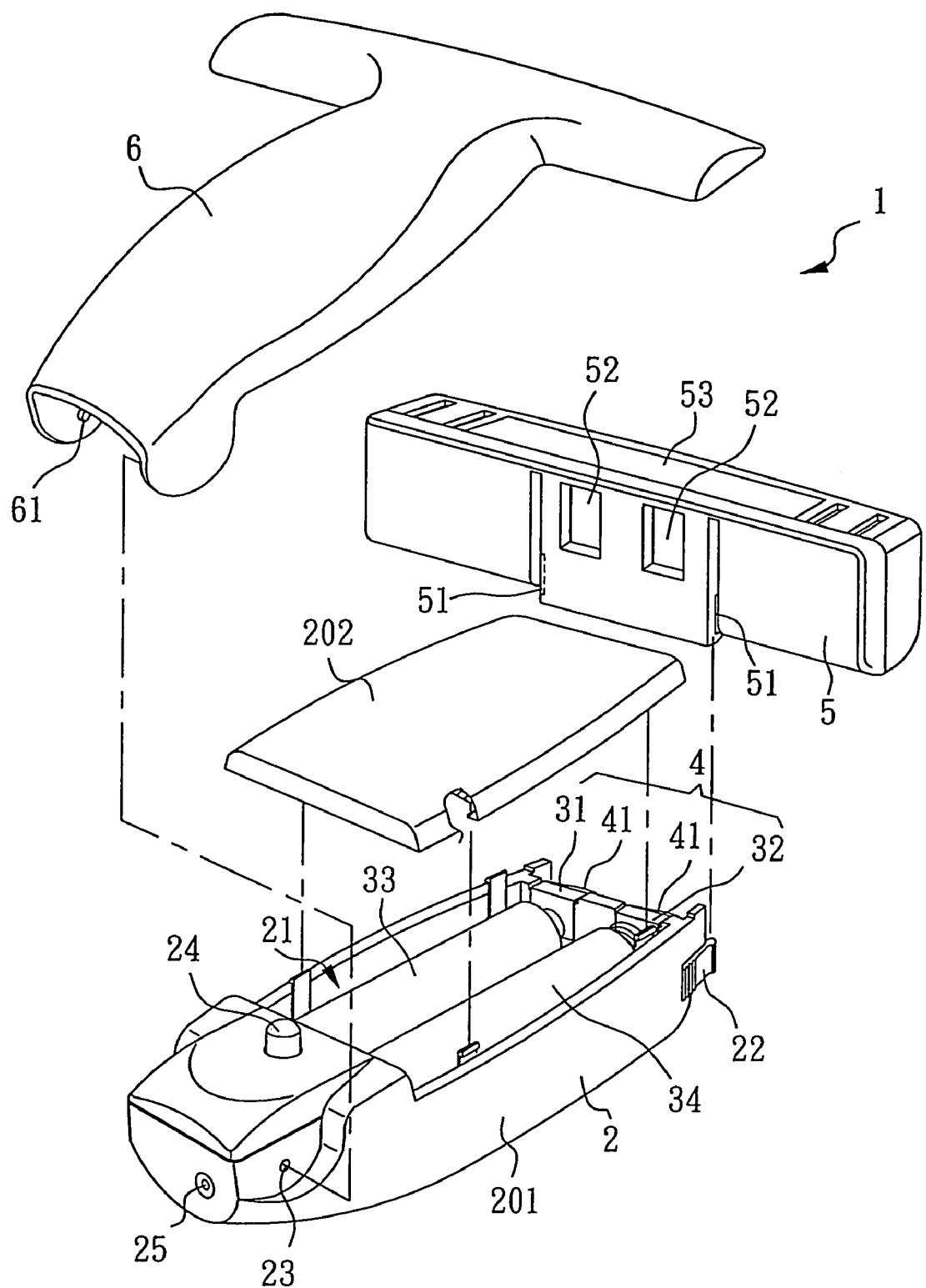
FIG. 1 is an exploded view of a detachable heat sealing apparatus according to a first embodiment of the present invention.
Figure 2:
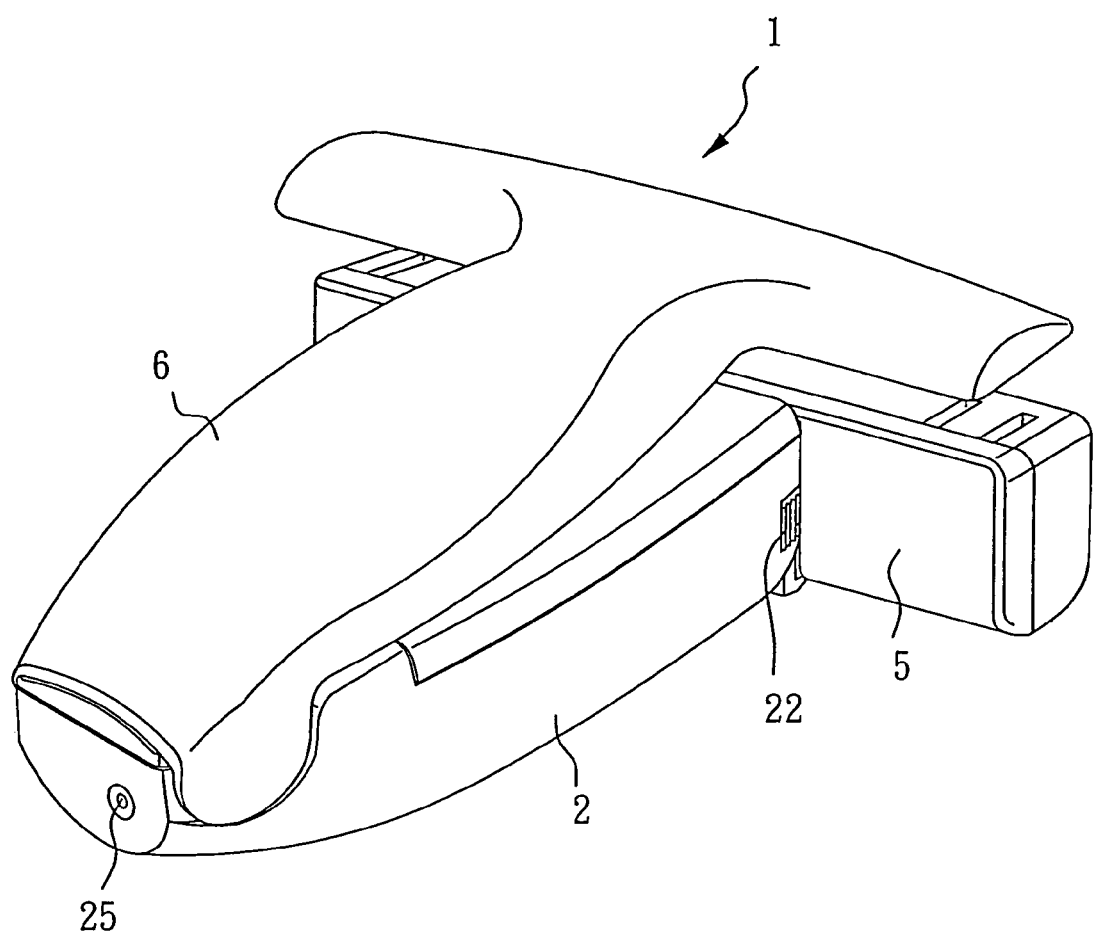
FIG. 2 is a perspective view of the detachable heat sealing apparatus according to the first embodiment of the present invention.

FIG. 1 is an exploded view of a detachable heat sealing apparatus constructed according to the first embodiment of the present invention. FIG. 2 is a perspective view of the detachable heat sealing apparatus according to the first embodiment of the present invention. As illustrated, the detachable heat sealing apparatus, referenced by 1, is comprised of an elongated casing 2, a power supplier 4, a size-adjustable unitary externally-attached electric heating device 5, and a handle 6. The elongated casing 2 is comprised of a body shell 201 and a top cover shell 202. The body shell 201 comprises a receiving open chamber 21, a coupling structure 22 bilaterally disposed near the external front side, and a mounting structure 23 in the rear side. The top cover shell 202 is mounted on the body shell 201 to close the receiving open chamber 21. According to this embodiment, the coupling structure 22 is formed of two hooks; the mounting structure 23 is a transversely extended pivot hole.

The power supplier 4 is installed in the receiving open chamber 21 inside the body shell 201 of the elongated casing 2, and comprises two power terminals 31 and 32, and two power source members 33 and 34 electrically and respectively connected to the power terminals 31 and 32. The two power terminals 31 and 32 are respectively extended to the outside of the front side of the body shell 201 of the elongated casing 2, forming positive pole and negative pole contacts 41. The power terminals 31 and 32 have the respective other end connected to an electric conduction plate (not shown) to form an electric current loop. According to this embodiment, the power terminals 31 and 32 are conducting metal plates; the power source members 33 and 34 are battery cells.

The electric heating device 5 comprises a coupling structure 51 detachably coupled to the coupling structure 22 of at external front side of the elongated casing 2. According to this embodiment, the coupling structure 51 is formed of two hook holes respectively detachably hooked up with the hooks (coupling structure) 22 of the elongated casing 2. The externally-attached electric heating device 5 further comprises two power terminals 52, which are maintained in contact with the contacts 41 of the power terminals 31 and 32 of the power supplier 4 after connection of the hook holes (coupling structure) 51 of the electric heating device 5 to the hooks (coupling structure) 22 of the elongated casing 2, and an elongated metal heating element 53 located on one side thereof and electrically connected to the power terminals 52 for producing heat after electric connection of the power terminals 52 to the power supplier 4.

The handle 6 has a mounting structure 61 disposed in one end and pivotally coupled to the mounting structure 23 of the elongated casing 2. According to this embodiment, the mounting structure 61 is comprised of two pivot rods respectively pivotally inserted into the two distal ends of the transversely extended pivot hole (mounting structure) 23 of the elongated casing 2. After installation of the handle 6, the detachable heat sealing apparatus 1 is assembled (see FIG. 2). When sealing a polybag or the like, the workpiece is put by a user on the metal heating element 53 of the electric heating device 5 and then the free end of the handle 6 is pressed downwards toward the electric heating device 5. During downward pivoting motion of the handle 6, a switch 24 is driven by the handle 6 to close the circuit, enabling electric current to pass from the battery cells (power source members) 33 and 34 to the metal heating element 53 of the externally-attached electric heating device 5 via the power terminals 31 and 32 of the power supplier 4 and the power terminals 52 of the electric heating device 5, and therefore the metal heating element 53 is caused to produce heat. Because the handle 6 is coupled to the elongated casing 2 by means of inserting the pivot rods (mounting structure) 61 into the ends of the transversely extended pivot hole (mounting structure) 23, the handle 6 can easily be detached from the elongated casing 2 for a replacement.

As indicated above, the externally-attached electric heating device 5 and the power supplier 4 are detachable. If the electric heating device 5 or the power supplier 4 becomes damaged, the electric heating device 5 can be separated from the elongated casing 2 for a replacement or repair work by means of disengaging the hooks (coupling structure) 22 of the elongated casing 2 from the hook holes (coupling structure) 51 of the externally-attached electric heating device 5.

Referring to FIG. 2 again, a power jack 25 is located at the rear side of the casing 2 for receiving a main power supply through an external power cable, i.e., the necessary electric power for the externally-attached electric heating device 5 can be obtained from the battery cells or an AC power source.

Figure 3:
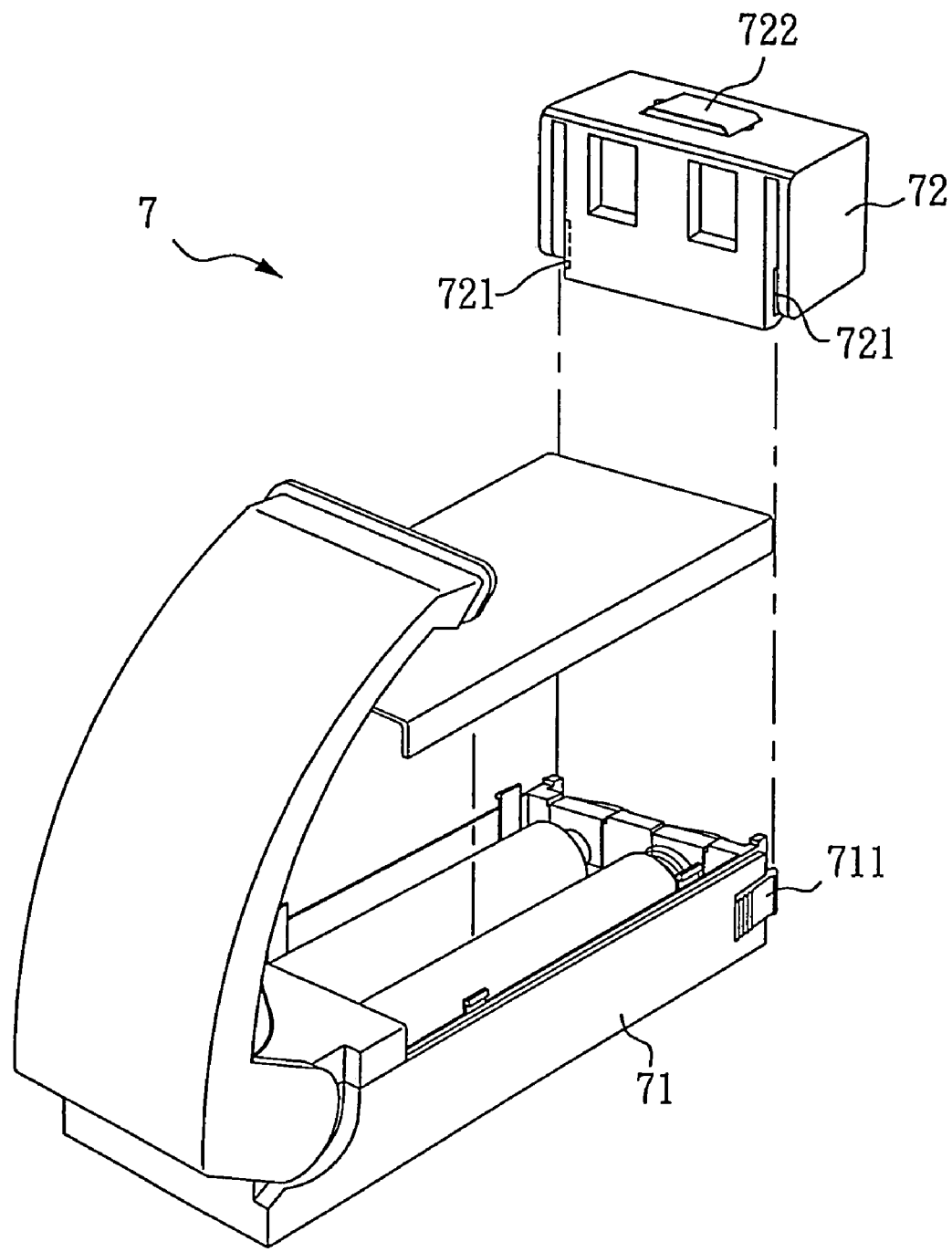
FIG. 3 is a perspective view of a detachable heat sealing apparatus according to a second embodiment of the present invention.

FIG. 3 is a perspective view of a detachable heat sealing apparatus 7 according to the second embodiment of the present invention. This embodiment is substantially similar to the aforesaid first embodiment with the exception of the design of the electric heating device. The externally-attached electric heating device 5 of the aforesaid first embodiment has an elongated metal heating element 53 for a wide sealing operation. According to this second embodiment, the electric heating device, referenced by 72, has a short metal heating element 722 located on the top side for a narrow area sealing operation, and two hook holes 721 detachably coupled to respective hooks 711 at the elongated casing, referenced by 71. Similar to the aforesaid first embodiment, the electric heating device 72 can easily be detached from the exterior of the elongated casing 71 for a replacement.

Referring to FIGS. 1~3 again, the elongated casings 2 and 71 have different shapes; however the coupling structures 22 and 711 are identical. Therefore, the user can attach either electric heating device 5 or 72 to the exterior of either elongated casing 2 or 71 to fit different operation requirements.

Figure 4:
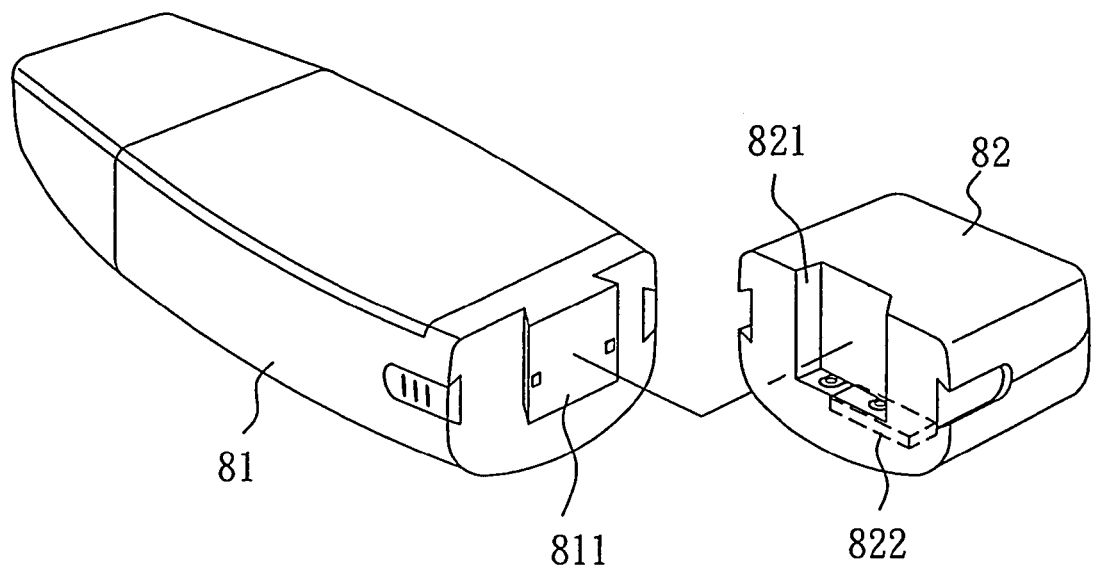
FIG. 4 is a perspective view of a detachable heat sealing apparatus according to a third embodiment of the present invention.

FIG. 4 is a perspective view of a detachable heat sealing apparatus according to the third embodiment of the present invention. According to this embodiment, the detachable heat sealing apparatus eliminates the aforesaid handle; the coupling structure 811 of the elongated casing 81 is a dovetail tongue disposed in the rear side; the coupling structure 821 of the externally-attached electric heating device 82 is a dovetail groove for connection to the dovetail tongue of the coupling structure 811 of the elongated casing 81. When in use, the metal heating element 822 of the electric heating device 82 is directly pressed on the workpiece.

Figure 5:
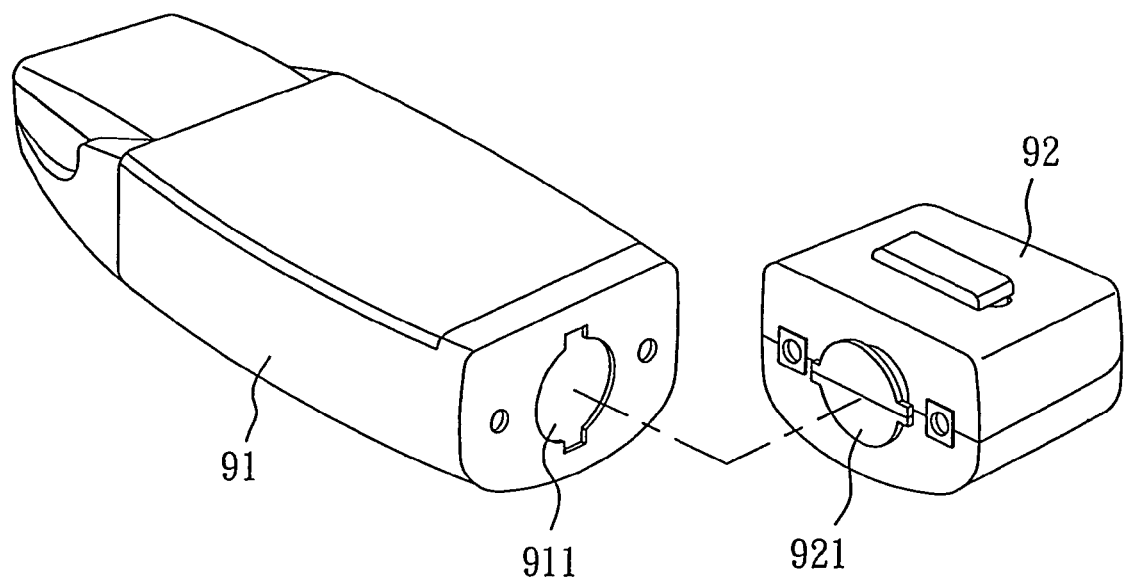
FIG. 5 is a perspective view of a detachable heat sealing apparatus according to a fourth embodiment of the present invention.

FIG. 5 is a perspective view of a detachable heat sealing apparatus according to the fourth embodiment of the present invention. This embodiment is substantially similar to the aforesaid third embodiment with the exception of the detachable arrangement between the casing and the externally-attached electric heating device. According to this fourth embodiment, the coupling structure 911 of the elongated casing 91 is a coupling hole disposed in the rear side; the coupling structure 921 of the electric heating device 92 is a coupling flange, which is fastened to the elongated casing 91 when inserted into the coupling hole of the coupling structure 911 and rotated through an angle relative to the coupling hole of the coupling structure 911. This embodiment enables the electric heating device 92 to be detachably fastened to the elongated casing 91.

Although particular embodiments of the present invention have been described in detail for purposes of illustration, various modifications and enhancements may be made without departing from the scope of the invention. Accordingly, the invention is not to be limited except as by the appended claims.

What is claimed is:

1. A detachable heat sealing apparatus comprising:
    an elongated casing, said elongated casing comprising a receiving chamber, a mounting structure, and a coupling structure comprised of at least one hook at an external front side of said elongated casing;
    a power supplier mounted in said receiving chamber inside said elongated casing, said power supplier having contact means for output of electric power;
    a size-adjustable unitary externally-attached electric heating device, said unitary externally-attached electric heating device comprising a coupling structure and power terminal means, wherein said coupling structure of said electric heating device includes at least one hook hole to receive and fasten the at least one hook of the coupling structure of said elongated casing so as to detachably fasten said electric heating device to the coupling structure of said elongated casing at an external front side of said elongated casing, said power terminal means being for contacting the contact means of said power supplier to receive electric power from said power supplier; and
    a handle, said handle comprising a mounting structure adapted to pivotally couple said handle to the mounting structure of said elongated casing.

2. The detachable heat sealing apparatus as claimed in claim 1, wherein said power supplier comprises at least one power terminal extended out of said elongated casing and forming said contact means, and at least one power source member electrically connected to said at least one power terminal.

3. The detachable heat sealing apparatus as claimed in claim 1, wherein said elongated casing comprises a body shell and a top cover shell covered on said body shell to close said receiving chamber.

4. The detachable heat sealing apparatus as claimed in claim 2, wherein said at least one power source member is respectively comprised of a battery cell.

5. A detachable heat sealing apparatus comprising:
    an elongated casing, said elongated casing comprising a receiving chamber, and at least one hook at an external front side of said elongated casing;
    a power supplier mounted in said receiving chamber inside said elongated casing, said power supplier having contact means for output of electric power; and
    a size-adjustable unitary externally-attached electric heating device, said unitary externally-attached electric heating device comprising a coupling structure and power terminal means, wherein said coupling structure of said electric heating device includes at least one hook hole to receive and fasten the at least one hook of said elongated casing so as to detachably fasten said electric heating device to the coupling structure of said elongated casing at an external front side of said elongated casing, said power terminal means being for contacting the contact means of said power supplier to receive electric power from said power supplier.

6. The detachable heat sealing apparatus as claimed in claim 5, wherein said power supplier comprises at least one power terminal extended out of said elongated casing and forming said contact means, and at least one power source member electrically connected to said at least one power terminal.

7. The detachable heat sealing apparatus as claimed in claim 5, wherein said elongated casing comprises a body shell and a top cover shell covered on said body shell to close said receiving chamber.

8. The detachable heat sealing apparatus as claimed in claim 6, wherein said at least one power source member is respectively comprised of a battery cell.

* * * * *